United States Patent Office 3,276,971
Patented Oct. 4, 1966

3,276,971
METHOD OF PRODUCING 5'-NUCLEOTIDE BY PHYTOPATHOGENIC MICROORGANISMS
Hiroshi Tone, Kawasaki, Ko Sasaki and Yoshio Sayama, Yokohama, and Tadashi Sakamoto, Tomoyuki Ishikura, and Noboru Miyachi, Tokyo, Japan, assignors to Sanraku Ocean Kabushiki Kaisha
No Drawing. Filed Dec. 16, 1965, Ser. No. 514,403
Claims priority, application Japan, Jan. 20, 1962, 37/1,862; Apr. 30, 1962, 37/16,780; May 1, 1962, 37/17,361; June 11, 1962, 37/23,293
9 Claims. (Cl. 195—28)

This application is a continuation-in-part of Serial No. 248,203 filed December 31, 1962 and now abandoned.

The present invention relates to a method of producing highly purified 5'-nucleotide with high yield from nucleic acid by using an enzyme or enzyme system with hitherto unknown properties which is formed by a phytopathogenic microbe; conducting the enzyme reaction at an unconventionally high temperature; and eliminating or minimizing the unnecessary by-products through said high temperature reaction and the peculiar properties of said enzyme.

The nucleotide which is derived from the nucleic acid, has many applications other than academic. Especially the 5'-nucleotide, the nucleotide with a phosphoric acid group in the 5'-position of ribose, is an important substance from a biochemical standpoint and is recently becoming important, particularly in the pharmaceutical and food industry.

Heretofore phytopathogenic microorganisms have not been applied in the field of nucleic acid hydrolysis. It has now been found that several of these microorganisms possess enzymes or enzyme systems which are capable of hydrolyzing nucleic acid to form specifically 5'-nucleotide.

Enzymes or enzyme systems produced by phytopathogenic microorganisms are made to react wtih nucleic acid so that the latter is hydrolyzed to form specifically 5'-nucleotides and the 5'-nucleotides thus produced are recovered.

The microbes available for this method, as stated above, belong to genus Macrophomina, genus Ascochyta, genus Phoma; for example, *Macrophomina phaseoli* (in Japan this is called *Sclerotium bataticola*) (ATCC No. 14725), *Ascochyta phaseolorum* (ATCC No. 14728), *Phoma cucurbitacearum* (ATCC No. 14864), etc. All of these are phytopathogenic microorganisms.

Some of the mycological nad phytopathogenic properties of these microbes are known, but their singular property of producing enzymes that can form specifically 5'-nucleotide has been unknown and the present inventors are the first to reveal this property.

These microbes can be cultivated on the common culture medium, that is, using starch, sucrose, maltrose, glucose, etc., as the source of carbon, and nitrate, ammonium salt, peptone, etc., as the source of nitrogen, but these being phytopathogenic microorganisms, it would be more desirable to adopt the medium containing organic substances. In case they are aerobic, either solid culture or liquid culture will be available. If bran is employed as the medium of solid culture no replenishment of sugar and nitrogen will be required, particularly no addition of trace elements will be needed, with great economical advantage. Even in this case the addition of nutrients gives better effect. The cultivating temperature of 18° C. to 33° C. will be suitable as in the case of cultivating a common mold. The appearance of the enzyme activity requires from 4 to 10 days, but it will vary slightly depending on the strain.

The enzyme or enzyme system produced by the microbes thus cultivated can be used in whatever form, provided its activity is retained; for instance, a solid culture, its extract; a liquid culture; its filtrate; a living cell, a dried one, or their grindings, lysates or extracts thereof; or an enzyme preperation obtained by purifying through salting out, organic solvent precipitation, adsorption, chromatography or other means. As the starting material, polymerized nucleic acids, or partially degraded nucleic acids may be used. Both ribonucleic acid and desoxyribonucleic acid may be used, but ribonucleic acid is more economical. When it is extracted from a living cell or tissue, usually the extract can be employed without further purification.

The prominent features of this invention lie in the following points:

The 5'-phosphodiesterase produced by these strains has a remarkably higer optimum temperature than the hitherto known enzymes; accordingly the hydrolysis reaction for obtaining 5'-nucleotide from ribonucleic acid (RNA) using this enzyme can take place at such high temperatures above 65° C. as 75° C., and this high-temperature hydrolysis has various advantages as described later.

Chemical reactions, when conducted under high temperaures, are liable to be attended with side reactions, which tend to diminish the yield of target substance or increase the impurities in it. If, however, hydrolysis by enzyme action is carried out at high temperatures, many advantages not obtained at low temperatures will be gained.

First, the enzyme can be utilized in its crude form. Microbes, when cultivated, will usually produce not simply one kind of enzyme. Therefore, if as is commonly done, a culture or its extract is directly employed as the enzyme solution, enzymes present other than the necessary one often will catalyze undesirable side reactions, the result being a lowering of the yield of target substance or increasing the impurities.

In the formation of 5'-nucleotide through reaction of 5'-phosphodiesterase from RNA, enzymes which cause undesirable side reactions are 3'-phosphodiesterase (so-called ribonuclease, etc.) which hydrolyzes RNA into 3'-nucleotide and phosphatase (including 5'-nucleotidase) which further hydrolyzes 5'-nucleotide, i.e., converts the target substance into nucleoside and inorganic phosphorus. Usually, even the microorganisms which have been isolated as 5'-phosphodiesterase-producing strain produce, though in smaller amount than 5'-phosphodiesterase, some enzymes which cause these undesirable side reactions. Therefore, to inhibit such undesirable re-actions due to these enzymes, the conventional method has been to adopt such enzyme inhibitors as sodium fluoride, phosphates, arsenates, cyanates, amoni acids, e.g. cystein, glutamine, ethylenediamine tetraacetic acid, metal ion, e.g., $Z^{++}$ $Cu^{++}$, etc. But additions of these agents are likely to raise the production cost and also affect the process of separating and refining 5'-nucleotide from the reaction mixture. Particularly, such additions are unfavorable for the purpose of obtaining highly purified 5'-nucleotide, because of the possibility of contamination by impurities.

Meanwhile, said side reaction-catalyzing enzymes can react at 30° C.–40° C. but at higher temperature they will lose activity and not be able to react. Therefore, if it is possible to hydrolyze RNA to 5'-nucleotide at such high temperature as to inactivate the enzymes causing the undesirable side reaction, the addition of the said conventional inhibitors will become needless; and the higher the reaction temperature, the more perfectly the reactions can be inhibited. Thus, given the knowledge of the art prior hereto, it would be necessary to purify 5'-phosphodiesterase to such extent that the ratio of purified 5'-phosphodiesterase to said side-reaction-catalyzing enzyme may be increased. If the reaction is carried out in accordance with the present invention, to take place at temperatures higher than 65° C. and ranging upward to 75° C., said side-reaction-catalyzing enzymes will be substantially completely inactivated.

For this reason, if a strain that can produce such high temperature-active enzyme is employed as source of 5'-phosphodiesterase, the enzyme may be used even in its crude form.

Second, as stated before, 5'-nucleotide, i.e., the target product, can easily be obtained with high purity and high yield. Namely, when substances other than 5'-nucleotide, particularly 3'-nucleotide, etc., are undesirably formed through side reactions, they must be separated from 5'-nucleotide. This, industrially, presents a very difficult job; it involves a risk of lowering the yield of 5'-nucleotide. That is, the formation of substances other than 5'-nucleotide from RNA will mean a lower yield of 5'-nucleotide.

Third, high reaction temperature greatly accelerates the reaction rate and this will prove very favorable for industrial production.

Experimental examples of these points are to be cited here.

*Phoma cucurbitacearum* (ATCC 14864) was cultured on bran medium and the extract therefrom was taken as an enzyme solution. Then the thermostabilities of the four enzymes contained in said solution, namely: 5'-phosphodiesterase, 3'-phosphodiesterase, phosphatase (5'-nucleotidase) and 3'-nucleotidase to be mentioned later were investigated.

Said enzyme solution was treated for 10 minutes at each temperature between 20° C. and 100° C. and thereafter the residual enzyme activity was measured with the results as follows:

| Temperature, °C. | 5'-Phosphodiesterase | 3'-Phosphodiesterase | Phosphatase (5'-Nucleotidase) | 3'-Nucleotidase |
|---|---|---|---|---|
|  | Percent | Percent | Percent | Percent |
| 20 | 100 | 100 | 100 | 100 |
| 30 | 103 | 98 | 98 | 100 |
| 40 | 107 | 65 | 85 | 100 |
| 50 | 107 | 10 | 30 | 98 |
| 60 | 107 | 5 | 15 | 97 |
| 70 | 100 | 0 | 5 | 97 |
| 80 | 95 | 0 | 0 | 97 |
| 90 | 80 | 0 | 0 | 80 |
| 100 | 60 | 0 | 0 | 40 |

As seen from above, 3'-phosphodiesterase and phosphatase, which catalyze the undesirable side reaction, completely lose their activities under high temperatures.

Reaction temperatures of these enzymes are as follows, with the temperature at which maximum activity is exhibited being given as 100.

| Temperature, °C. | 5'-Phosphodiesterase | 3'-Phosphodiesterase | Phosphatase (5'-Nucleotidase) | 3'-Nucleotidase |
|---|---|---|---|---|
|  | Percent | Percent | Percent | Percent |
| 20 | 5 | 50 | 35 | 25 |
| 30 | 5 | 77 | 64 | 50 |
| 40 | 8 | 100 | 96 | 70 |
| 50 | 21 | 57 | 100 | 87 |
| 55 | 35 | 23 | 93 | 90 |
| 60 | 54 | 22 | 71 | 97 |
| 65 | 90 | 13 | 19 | 98 |
| 70 | 100 | 0 | 1 | 100 |
| 75 | 90 | 0 | 0 | 97 |
| 80 | 10 | 0 | 0 | 10 |
| 85 | 5 | 0 | 0 | 5 |
| 90 | 3 | 0 | 0 | 5 |

As experimental examples show, comparing the reaction at 40° C. and that at 70° C., the yield of 5'-nucleotide after the same lapse of time is about 12 times as large in the latter reaction as in the former, which means that the rate of latter reaction is about 12 times as fast as that of the former.

As described above, in the formation of 5'-nucleotide through hydrolysis of RNA by 5'-phosphodiesterase, if 5'-phosphodiesterase reacting between 65° C.–75° C. is used, a great industrial advantage will emerge: Using a crude enzyme solution, highly purified 5'-nucleotide can be obtained with high yield and in short time at that.

As explained above, elevation of reaction temperature in enzyme reaction offers an industrial advantage; but the enzyme used for this purpose is itself protein and will be denatured and lose its activity when exposed to high temperature. This is a remarkably different property of enzyme from common catalysts in chemical reactions.

Therefore, there is a limitation to the increase in the temperature: The temperature shall not be so high as to denature the enzyme protein and deprive it of its activity. Thus, it would be an extreme difficulty to find any enzyme that can react at an exceedingly high temperature and in such upper ranges; the higher the temperature, the more difficult it will be. Since common protein is completely denatured around 65° C., it would be impossible from the traditional conception of enzyme to think of any enzyme which can react at 70° C.–75° C., i.e., 5° C.–10° C. higher than the above-mentioned temperature, without losing its activity, and which finds said range as an optimum operating temperature. This would be easy to understand in view of the tremendous efforts being rendered by enzymologists to prevent enzymes from being denatured and losing their activity through rise of temperature in their handling of enzymes. Hitherto it has been a common sense practice in the conventional handling of enzymes to try to keep them cool in the course of extracting, preserving or reacting them. From the fact that the optimum temperature for 5'-phosphodiesterase is as high as 70° C.–75° C., it is obvious that the 5'-phosphodiesterase, adopted in this invention is a unique enzyme protein beyond the scope of conventional conceptions of enzymes and their action.

The 5'-phosphodiesterase produced by the strains used in this invention is a novel enzyme hitherto unknown which possesses the following properties and offers industrial advantages derived therefrom.

This 5'-phosphodiesterase has, as well as 5'-phosphodiesterase activity, the 3'-nucleotidase activity which, as shown below, hydrolyzes 3'-nucleotide into nucleoside and inorganic phosphorus.

Action of 5'-phosphodiesterase:

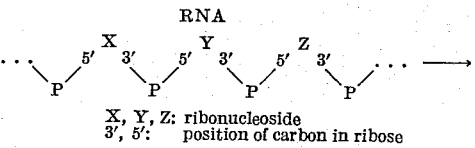

X, Y, Z: ribonucleoside
3', 5': position of carbon in ribose

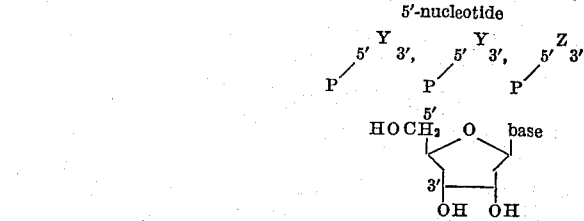

Action of 3'-nucleotidase:

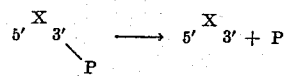

Such homogeneous enzyme protein that possesses concurrently 5'-phosphodiesterase activity and 3'-nucleotidase activity has never been known and has only been discovered by the present inventors. This discovery has been reported to academic circles by the present inventors.

For example, 5'-phosphodiesterase which was isolated and purified from the extract of Phoma cucurbitacearum culture was confirmed to be homogeneous by ultra-centrifuge sedimentation, electrophoresis, and chromatography; its 5'-phosphodiesterase activity and 3'-nucleotidase activity behaved entirely the same; and the thermal inactivation and the optimum reaction temperature were also the same for both these activities. Hydrolysis of RNA into 5'-nucleotide by means of such unique 5'-phosphodiesterase possessing both 5'-phosphodiesterase and 3'-nucleotidase activities offers the following industrial advantage.

The starting material of 5'-nucleotide production, i.e., RNA is usually extracted from yeast; when it is industrially extracted, hydrolysis will occur in the course of extraction and inconsequence the polymerization degree will fall; through this hydrolysis, phosphorus remains in the 3'-end group of the extracted RNA.

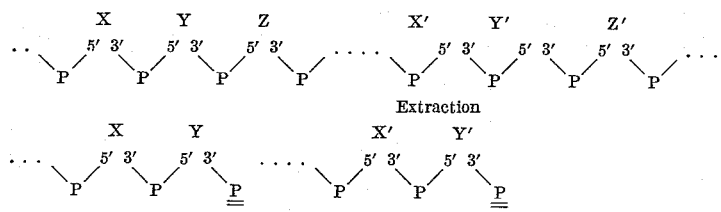

As the polymerization degree decreases, the end group with phosphorus bonded at 3'-position will increase.

When this RNA is hydrolyzed by 5'-phosphodiesterase, 5'-nucleotide will be produced and at the same time nucleoside 3',5'-diphosphate will be formed from the above-mentioned end group with phosphorus bonded at 3'-position.

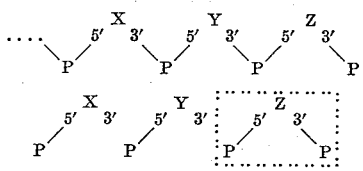

Formation of nucleoside 3',5'-diphosphate in this manner will mean that the 3'-terminal will not recover as 5'-nucleotide and lead to a poor yield of 5'-nucleotide.

When in this way nucleoside 3',5'-diphosphate is formed in the reaction mixture, there is a likelihood of nucleoside 3',5'-diphosphate infiltering into 5'-nucleotide in the separation and purification of 5'-nucleotide from the reacting solution; this would be a serious disadvantage for the production of highly purified 5'-nucleotide. And this disadvantage would be the more serious, when RNA employed as starting material is the lower in polymerization degree.

To liquidate such loss, the phosphorus at the end has only to be hydrolyzed preliminarily; but such hydrolysis would be chemically hard to execute, moreover such hydrolysis in the course of enzyme reaction would raise the production cost.

When, however, RNA is hydrolyzed using the enzyme as obtained from the strains used in this invention which possesses both 5'-phosphodiesterase and 3'-nucleotidase activity, the phosphorous at the 3'-terminal of the depolymerized RNA will be previously hydrolyzed to inorganic phosphorous by the action of 3'-nucleotidase and then the dephosphorylated RNA will be hydrolyzed to 5'-nucleotide by the action of 5'-phosphodiesterase without forming the undesirable nucleotide 3',5'-diphosphate. And also the nucleoside 3',5'-diphosphate formed from the 3'-terminal of the depolymerized RNA by the action of 5'-phosphodiesterase may be transformed into 5'-nucleotide by the simultaneous action of 3'-nucleotidase. Anyway, simultaneous action of both these activities will be able to yield 5'-nucleotide with no residue of nucleoside 3',5'-diphosphoric acid. Thus, without making any special treatment and causing any rise in the cost, the loss can be prevented. Accordingly, even if the quality of starting material, i.e., RNA is inferior, 5'-nucleotide will be obtained with high purity and maximum yield.

Meanwhile, an additional advantage is provided by the fact that, as described above and proved experimentally, the optimum temperature is within the range between 65° C.–75° C. for both 5'-phosphodiesterase activity and 3'-nucleotidase activity; if that temperature were lower for either of these activities, the earlier-mentioned side reaction might happen, but as stated above, both act at the same high temperatures, so that there is no possibility of side reaction. High reaction temperature of both enzyme activities will also prove favorable in the following case.

In the industrial hydrolysis of RNA, when a trouble occurs in the temperature control or in the preparation of reacting solution and as the result the reacting temperature fails to go so as to reach within the range between 65° C.–75° C., 3'-nucleotide which may be formed through the undesirable side reaction will be transformed into nucleoside through the action of 3'-nucleotidase by restoring the reacting temperature to the normal range; moreover, separation of nucleoside from nucleotide will be easy, so that there is absolutely no fear of 3'-nucleotide infiltration into 5'-nucleotide.

Thus, the possible loss in the yield of 5'-nucleotide through a trouble in its industrial production can be held to a minimum and highly purified 5'-nucleotide can be recovered.

As described above, the present invention relates to a method of obtaining highly purified 5'-nucleotide at high yield by hydrolyzing RNA by a new, unique enzyme, said enzyme being produced from *Phoma cucurbitacearum*, *Ascochyta phaseolorum* and *Macrophormina phaseoli* and characterized by possessing both 5'-phosphodiesterase action and 3'-nucleotidase action whose optimum temperatures for enzyme activity are as high as 65° C.–75° C.

For isolation and purification of the product, some differences between the formed 5'-nucleotide and the impurities to be removed in the physical, chemical properties such as adsorption, solubility, dialytic property, etc., are utilized and the 5'-nucleotide is obtained in an isolated form or in the form of salts. Anion exchange resin is recommendable for individual separation of the four kinds of 5'-nucleotide.

The following examples are used for the purpose of illustration only and do not limit the invention thereto.

*Example 1*

*Phoma cucurbitacearum* (ATCC 14864) isolated from *Cucurbita moschata* var. *toonas* was inoculated on 300 g. of culture medium consisting of one part of bran and one part of water; after 10 days at 25° C., it was extracted with 750 ml. of water. To 700 ml. of the extract was added 30 g. of yeast ribonucleic acid dissolved in about 1.0 liter of water. The resulting mixture was adjusted to pH=5.0 with acetic acid to yield a total volume of 3.0 liter. Then it was subjected to two-hour reaction at 70° C. and 20-minutes heat treatment at 100° C.; and thereafter was filtered. The filtrate was adjusted to pH=9.0 by NH$_4$OH; and 5'-nucleotide was adsorbed on Dowex 1 (Cl-type). As the result of elution by M/500–M/100 HCl, 5'-CMP 3.82 g. 5'-AMP 7.94 g., 5'-UMP 7.03 g. and 5'-GMP 5.79 g. were obtained.

Example 2

*Ascochyta phaseolorum* (ATCC 14728) was inoculated on 300 g. of culture medium consisting of one part of bran and one part of water; after 10 days at 25° C., it was extracted with 750 ml. of water. To 700 ml. of the extract was added 30 g. of yeast ribonucleic acid dissolved in about 1.0 liter of water. The resulting mixture was adjusted to pH=5.0 with acetic acid to yield a total volume of 3.0 liter. Then it was subjected to two-hour reaction at 70° C. and 20-minute heat treatment at 100° C.; and thereafter was filtered. The filtrate was adjusted to pH=9.0 by NH$_4$OH; and 5'-nucleotide was adsorbed on Dowex 1 (Cl-type). As the result of elution by M/500–M/100 HCl, 5'-CMP 3.60 g., 5'-AMP 7.60 g., 5'-UMP 6.80 g., and 5'-GMP 5.58 g. were obtained.

Example 3

Using *Macrophomina phaseoli* (ATCC 14725) causing gray stem rot in *Vingner sinensis*, 5'-CMP 3.55 g., 5'-AMP 7.66 g., 5'-UMP 6.92 g. and 5'-GMP 5.62 g. were obtained in the same as in Example 1.

Example 4

A culture medium was made from glucose 5%, NH$_4$Cl 0.3%, peptone 0.5%, yeast extract 0.95%, KH$_2$PO$_4$ 0.05%, K$_2$HPO$_4$ 0.05%, CaCl$_2$·2H$_2$O 0.04%, MgSO$_4$·7H$_2$O 0.04% (pH=6.0). *Phoma cucurbitacearum* isolated from *Cucurbita moschata* var. *toonas* was inoculated in 500 ml. of this solution of which 50 ml. had been placed in a 500 ml. shaking flask. This was incubated with shaking at 25° C. After seven days, the grown cells were harvested by filtration, washed with a cold 0.9% NaCl solution, ground together with a small amount of a M/20 tris buffer solution (pH=7.0) and quartz sand, and then centrifuged.

Fifty ml. of the cell-free extract thus prepared was mixed with 25 ml. of 3% yeast ribonucleic acid solution and 25 ml. of a M/3 acetate buffer solution (pH=5.0) to yield 150 ml. in total volume. After two hours reaction at 70°C., 50 ml. of uranyl reagent was added; the precipitate was removed by centrifugation after cooling, and the supernatant obtained was neutralized with KOH. The quantity of 5'-nucleotide contained in the resultant solution was determined, using a Dowex I (formate type) column; the yields were 5'-CMP 105 mg., 5'-AMP 220 mg., 5'-UMP 197 mg., and 5'-GMP 161 mg.

What is claimed is:

1. A method for producing 5'-nucleotides, which comprises: (a) culturing in a culture medium at a temperature of 18° C. to 33° C., inclusive, a strain selected from the group of microorganisms consisting of genus Phoma, genus Ascochyta and genus Macrophomina, which thereby produces an enzymatic active substance capable of forming specifically 5'-nucleotide from nucleic acid, said enzymatic active substance possessing both 5'-phosphodiesterase and 3'-nucleotidase enzymatic activity, (b) separating said enzymatic active substance from the microorganism culture, (c) reacting said enzymatic active substance at a temperature above 65° C. and as high as 75° C., with nucleic acid solution having an acid pH, thereby forming the 5'-nucleotides, and (d) recovering the thus formed 5'-nucleotides.

2. A method as claimed in claim 1 in which the culture medium is a solid medium and the strain is cultivated at a temperature of 25° C. to 30° C.

3. A method as claimed in claim 1 in which the culture medium is a liquid medium and the strain is cultivated at a temperature of 25° C. to 30° C.

4. A method as claimed in claim 1 wherein the enzyme is reacted with the nucleic acid solution at a temperature above 65° C. and as high as 75° C., inclusive, said solution having a pH of about 5.0.

5. A method as claimed in claim 1 in which the strain which produces said enzymatic active substance is a strain selected from the group consisting of *Phoma cucurbitacearum* (ATCC 14864), *Ascochyta phaseolorum* (ATCC 14728) and *Macrophomina phaseoli* (ATCC 14725).

6. A method as claimed in claim 1 in which said enzymatic active substance contained in said culture is separated from at least one substance selected from the group consisting of the culture extract, the culture filtrate, the living cells, the dried cells, their lysate, and cell free extract.

7. A method as claimed in claim 1 which the culture medium is a solid culture medium and comprises bran as its main constituent.

8. A method as claimed in claim 1 in which said enzymatic active substance is in crude form.

9. A method as claimed in claim 1 in which said enzymatic active substance is purified.

References Cited by the Examiner
UNITED STATES PATENTS 3,104,171 9/1963 Sakaguchi et al.
3,120,511 2/1964 Tanaka et al.

A LOUIS MONACELL, *Primary Examiner.*

A. E. TANENHOLTZ, *Assistant Examiner.*